UNITED STATES PATENT OFFICE.

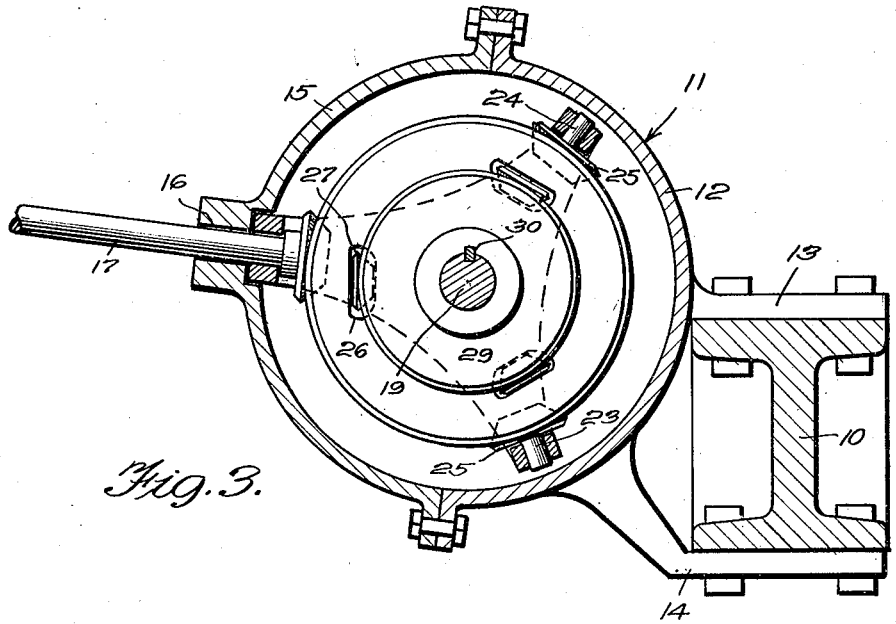
Fig. 3.
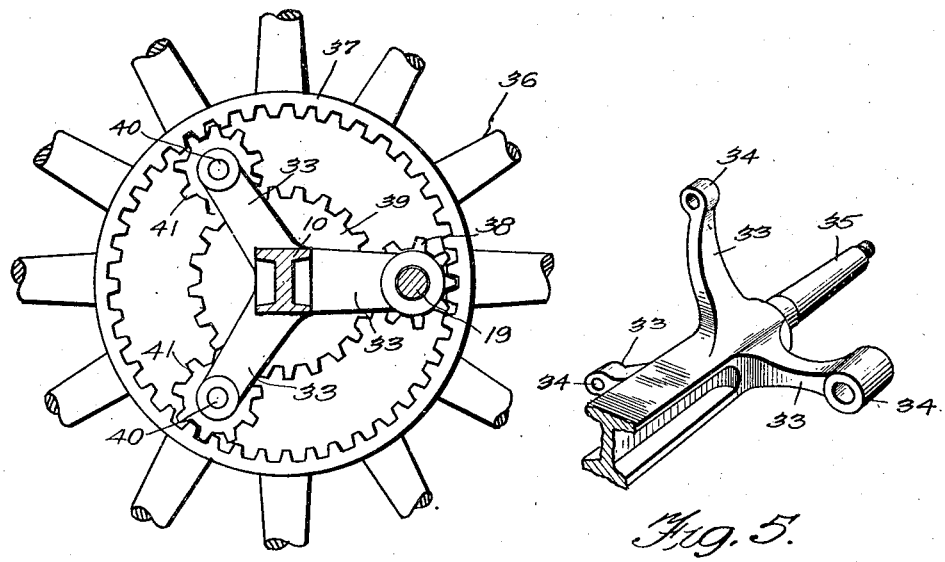
Fig. 4.
Fig. 5.
Inventor
Edgar James

EDGAR JAMES, OF LINCOLNTON, NORTH CAROLINA.

AUTOMOBILE-DRIVE.

1,352,130.   Specification of Letters Patent.   Patented Sept. 7, 1920.

Application filed June 21, 1919. Serial No. 305,752.

*To all whom it may concern:*

Be it known that I, EDGAR JAMES, a citizen of the United States, residing at Lincolnton, in the county of Lincoln and State of North Carolina, have invented certain new and useful Improvements in Automobile-Drives, of which the following is a specification.

My invention relates to new and useful improvements in drives for automobiles, and more particularly to drives for heavy machines or trucks or in any case where more durability is wanted in beveled or internal gearing.

At present the construction of the differential in trucks is such that the gear attached to the main drive rapidly becomes worn and subsequently strips thereby causing a great amount of labor and expense in tearing down the machine to insert the new parts. In order to overcome this objection I have provided in the differential and internal gearing of a machine idler wheels so arranged as to counterbalance thrusts in the various parts of the differential and internal gearing and thereby eliminate the grinding action which wears away the teeth of the gears.

Other objects and advantages of the invention will be apparent during the course of the following description.

In the accompanying drawings forming a part of this specification, and in which like numerals are employed to designate like parts throughout the same;

Fig. 3 is a section, taken on line 3—3 of Fig. 2, and enlarged for the purpose of clarity;

Fig. 4 is a section, taken on line 4—4 of Fig. 3; and

Fig. 5 is a detail perspective of the end of the rear axle.

Figure 1:
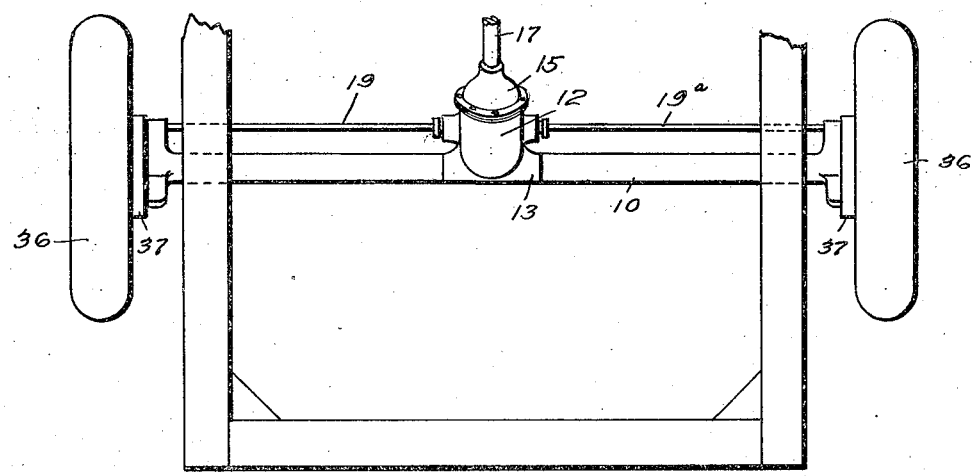
Figure 1 is a plan view of the rear end of a truck embodying my invention.
Figure 2:
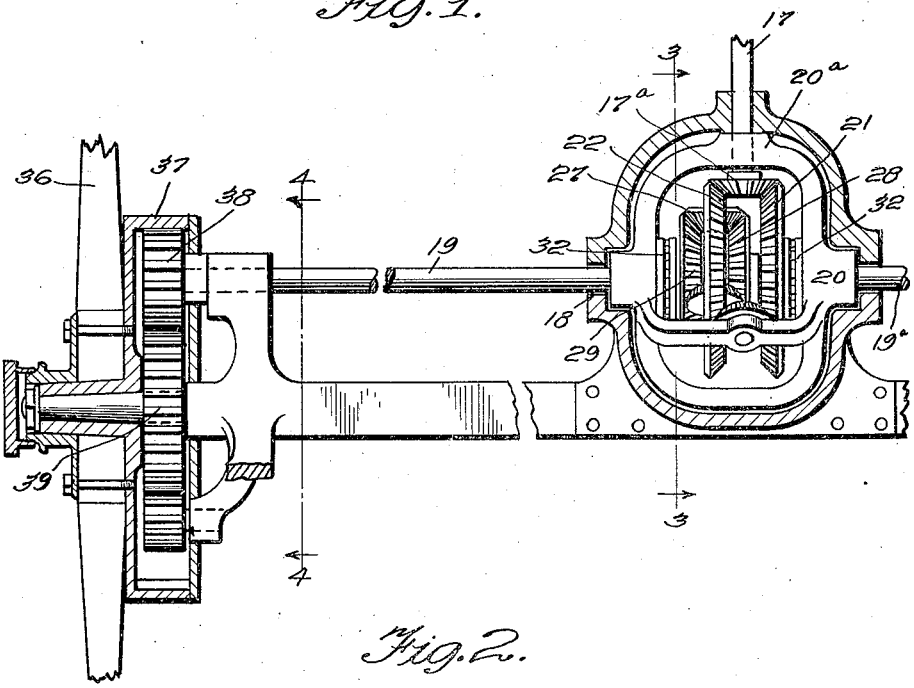
Fig. 2 is a section through the differential and the drive of the truck.

Referring now more particularly to the drawings, the numeral 10 indicates the rear axle of an automobile. The numeral 11 indicates a transmission casing as a whole, this casing comprising a rear section 12 secured to the axle 10 by means of brackets 13 and 14 bolted or otherwise secured to the axle and a forward section 15 having an opening 16 therein adapted to receive the rear end of the power shaft 17. The sides of the casing are provided with similarly arranged openings 18 adapted to receive drive shafts 19 and 19$^a$. Mounted within the transmission casing is a yoke 20 having spaced arms 20$^a$, these arms being arranged at any desired interval. The yoke is provided with openings, through which the ends of the shafts 19, 19$^a$ extend. One of the arms of the yoke has an opening in which is rotatably mounted the rear end of the power shaft 17. From the foregoing, it will be seen that the yoke is fixed against rotation within the casing. Rotatably mounted upon the end of the shaft 19$^a$ is a beveled gear 21, a similar beveled gear 22 being arranged upon the end of the shaft 19. Rotatably mounted on the arms 20$^a$ of the yoke are beveled pinions 25 having a stub shaft 24 which engages in a bearing formed in the arm. These pinions mesh with the gears 21 and 22. A similar pinion 17$^a$ is secured to the end of the drive shaft 17. It will now be apparent that when the power shaft is rotated the gears 21 and 22 will rotate freely upon the ends of the drive shafts 19 and 19$^a$ respectively. This construction counterbalances thrusts and gives efficiency in these gears inasmuch as the spaced pinions will prevent any wabbling, due to looseness of the gears.

The gear 22 is provided with openings 26 in which are mounted pinions 27. Secured to the end of the shafts 19$^a$ and 19 respectively are gears 28 and 29, these gears being secured to the shafts by keys 30 or the like. The gear 22, pinions 27 and gears 28 and 29 form the usual differential of the automobile. To prevent side thrust in the differential thrust collars or end thrust bearings 32 are supplied.

The arrangement of the drive on both shafts 19 and 19$^a$ being identical, a description of but one will suffice. The axle 10 is provided at its end with radial arms 33 provided with bearings 34 for a purpose hereinafter to be described. This axle is also provided with the usual stub axle 35 to receive the drive wheel 36 provided with the usual internal rim gear 37. The shaft 19 extends through one of the bearings at the end of one of the radial arms 33 and is provided with a pinion 38 meshing with the internal rim gear 37. This pinion also meshes with a gear 39 mounted upon the stub axle 35. On the other remaining arms of the axle are mounted stub shafts 40 having pinions 41 thereon. These pinions likewise engage the rim gear 37 and the gear 39. It will be obvious that the gear 39 might be made of the floating type, that is to say, its internal bore might be of such size that it does not engage stub axle 35.

It will readily be seen that the form of drive supplied is of the full floating type and at the same time the thrust generally present in this type of drive has been eliminated by my particular construction. It will also be obvious that instead of providing the axle 10 with the radial arms 33 the usual dust plate may be provided and the bearings for the pinions and drive shaft formed therein.

It is to be understood that the form of my invention herewith shown and described is to be taken as the preferred example of the same, and that various changes in the shape, size and arrangement of parts may be resorted to without departing from the spirit of the invention or the scope of the subjoined claims.

Having thus described my invention, I claim:

1. In a device of the type described, a yoke, oppositely extending shafts having their inner ends rotatably mounted therein, said yoke having spaced arms thereon, a gear rotatably mounted on each of said shafts, one of said gears being provided with openings, pinions rotatably mounted upon the arms of said yoke and meshing with said gears, gears mounted on the inner ends of said shafts and disposed on opposite sides of one of said first named gears, and pinions mounted in said openings and meshing with said last named gears.

2. In a device of the character described, a yoke, oppositely extending shafts having their inner ends rotatably mounted therein, said yoke having spaced arms thereon, a gear rotatably mounted upon one of said shafts at the inner end thereof, a gear rotatably mounted on the other of said shafts adjacent the inner end thereof but spaced therefrom, a gear secured to the first named shaft adjacent the inner end thereof, a gear secured to the inner end of said second named shaft, a power shaft mounted in one of the arms of said yoke and provided with a pinion meshing with the gears rotatably mounted upon said shaft, an idler pinion mounted in each of the remaining arms of said yoke and meshing with said rotatably mounted gears, and pinions rotatably carried by one of said rotatable gears and meshing with the gears secured to said shafts.

In testimony whereof I affix my signature in presence of two witnesses.

EDGAR JAMES.

Witnesses:
 WILLIAM LANDER,
 M. H. CLINE.